Oct. 24, 1967  H. B. F. JENSEN  3,348,440
AUXILIARY OPERATION CONTROL FOR AUTOMATIC SYSTEMS
Filed Nov. 25, 1964  8 Sheets-Sheet 3
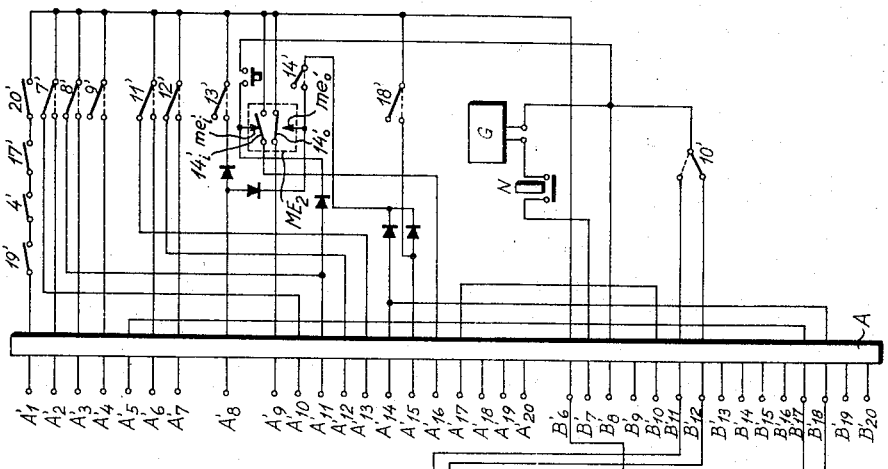
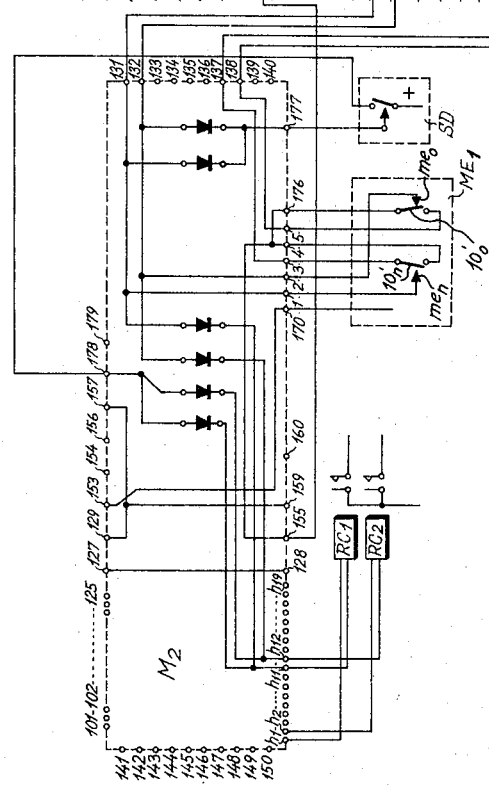
Fig. 3.
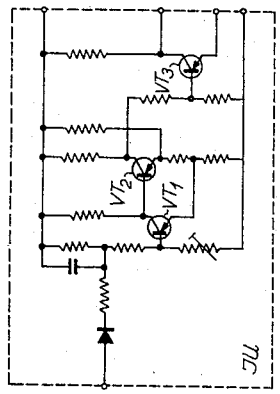
Fig. 10.
INVENTOR
Hermann Børge Funck Jensen
Dicke & Craig
BY
ATTORNEYS

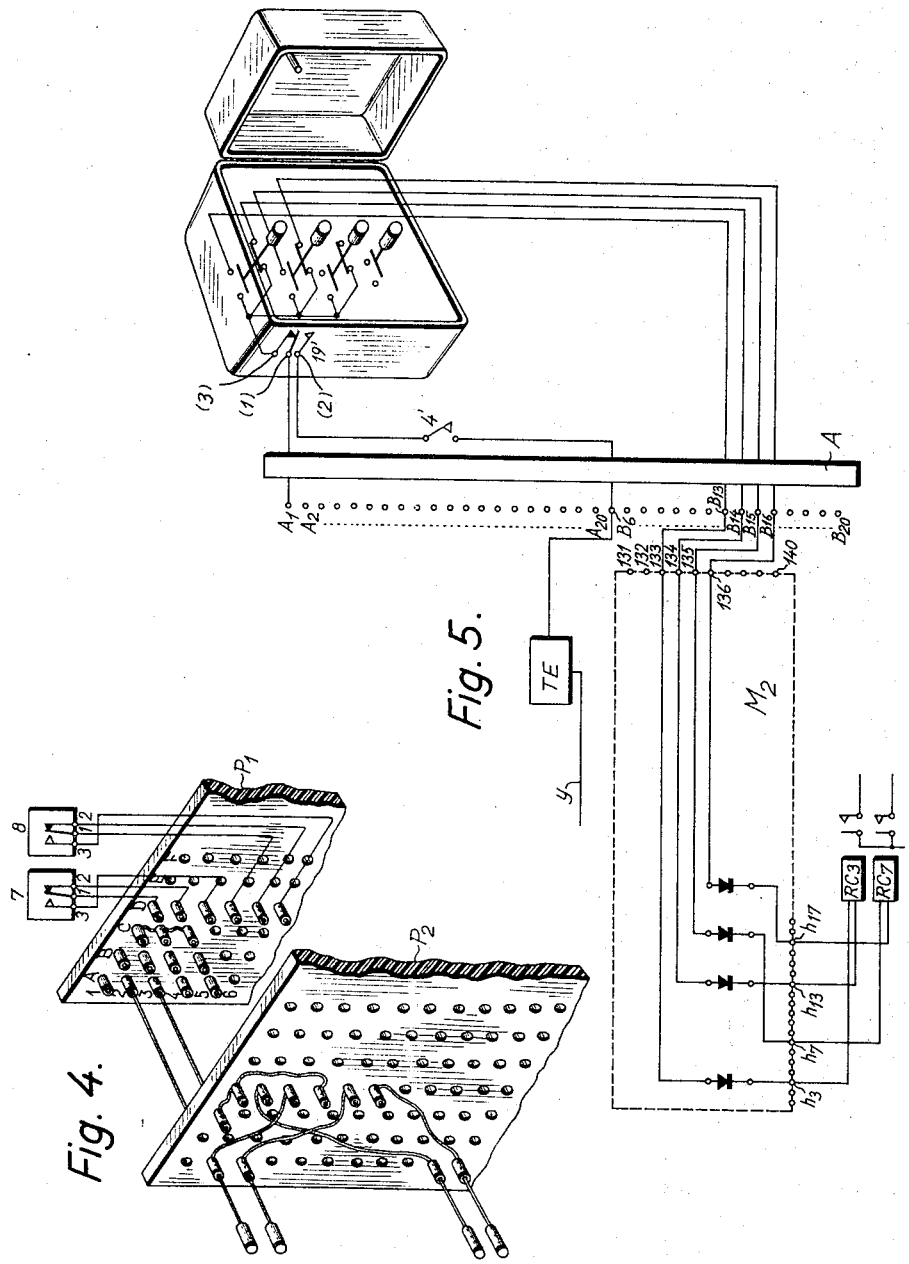

United States Patent Office 3,348,440
Patented Oct. 24, 1967

3,348,440
AUXILIARY OPERATION CONTROL FOR
AUTOMATIC SYSTEMS
Hermann Børge Funck Jensen, Aarhus, Denmark
(16 Moller Meyersvej, Aarhus-Risskov, Denmark)
Filed Nov. 25, 1964, Ser. No. 413,918
46 Claims. (Cl. 83—58)

The present invention is a continuation-in-part of my copending application Ser. No. 35,252, now U.S. Patent 3,229,556.

This invention relates to automation of working machines are more particularly automation of working machines by means of sequence control.

The term "sequence control" used herein and in the following claims shall mean a control system for a working machine in which sensings of data on the machine produced by sensing devices on the machine are correlated to commands which are adapted to actuate machine function members on the machine in such a manner that a command to initiate or terminate a machine function is only given when the machine is conditioned therefor according to a planned programme.

It is a purpose of the invention to provide a sequence control arrangement for the automation of a working machine which includes facilities to render the system highly versatile.

Figure 1:
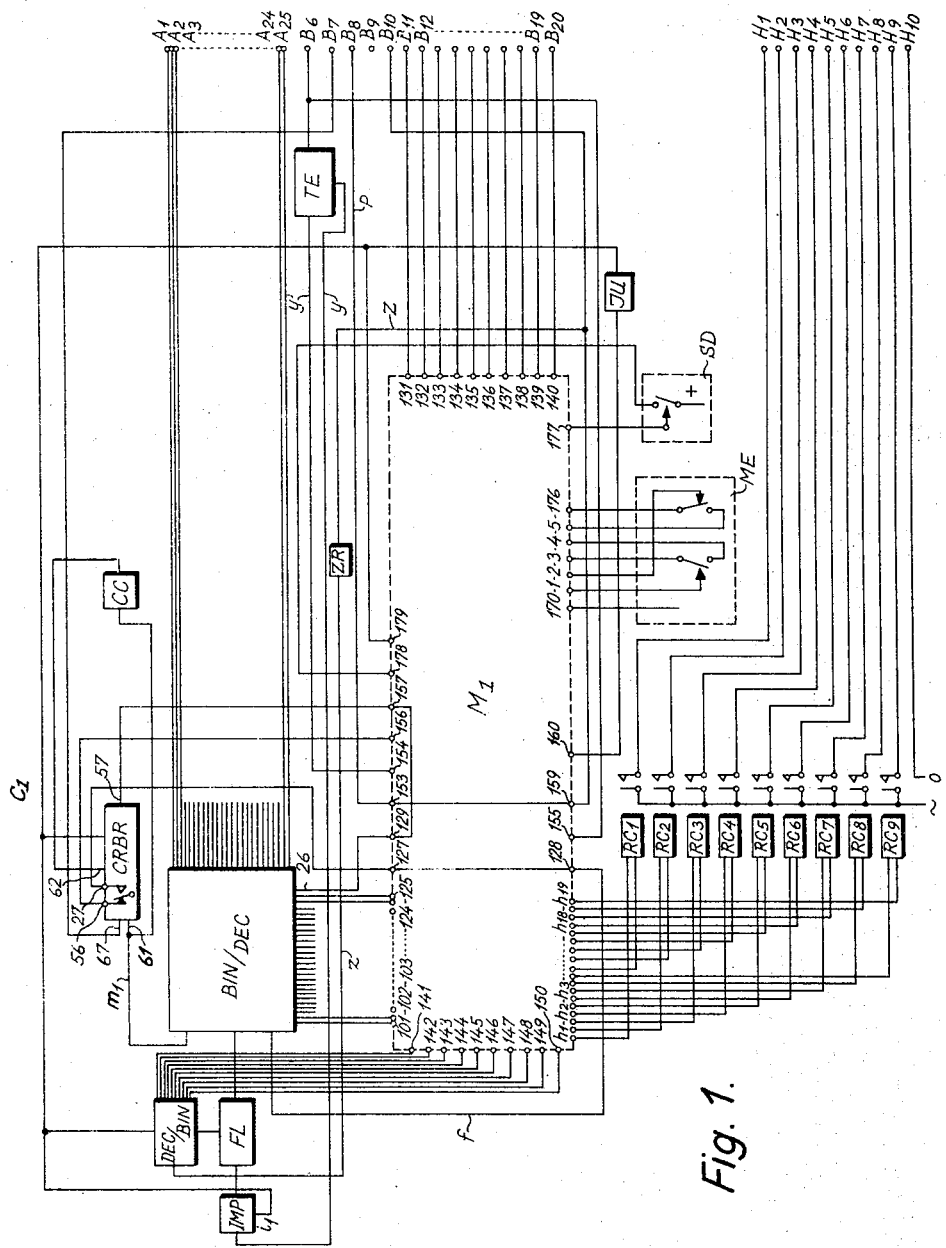
Figures 2, 11:
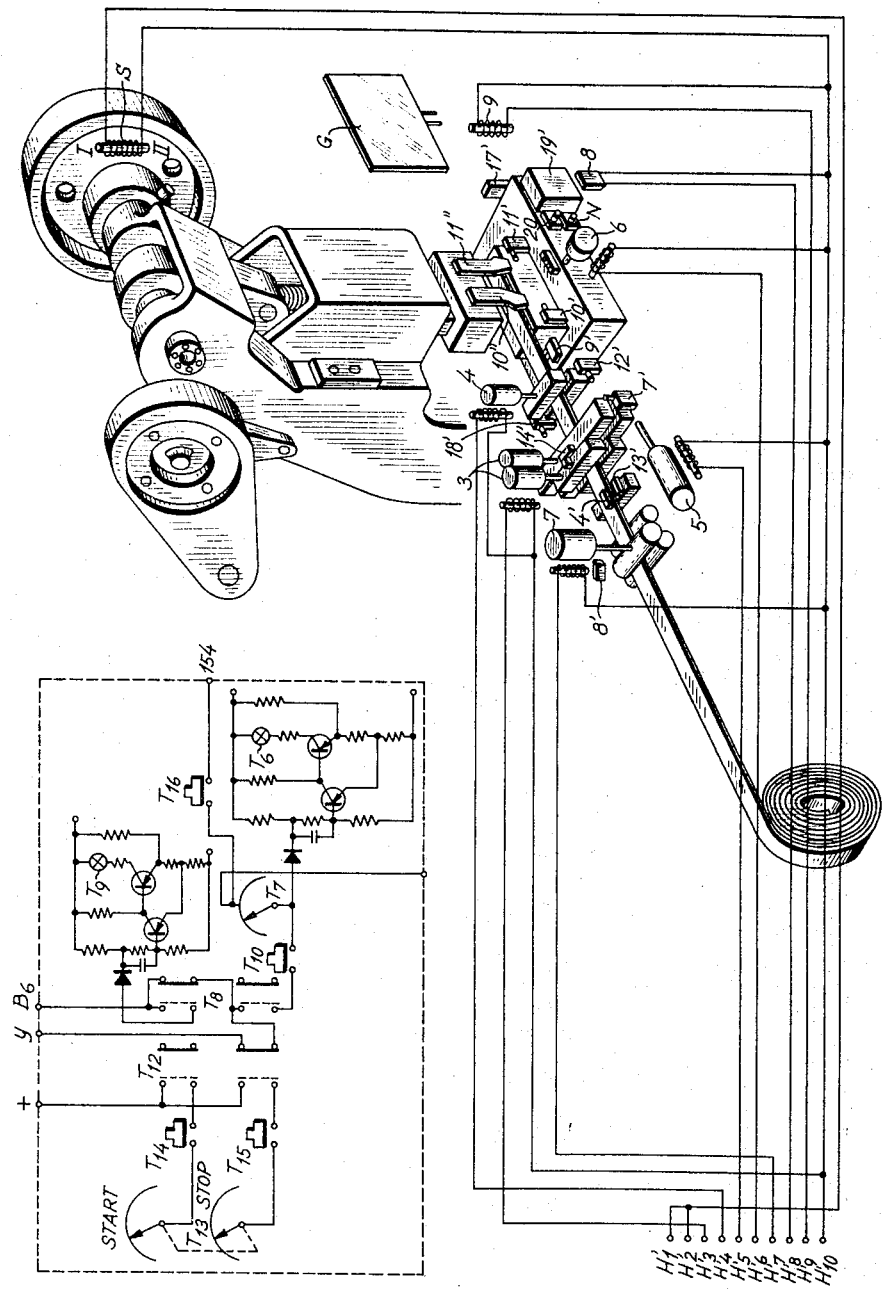
Figure 6:
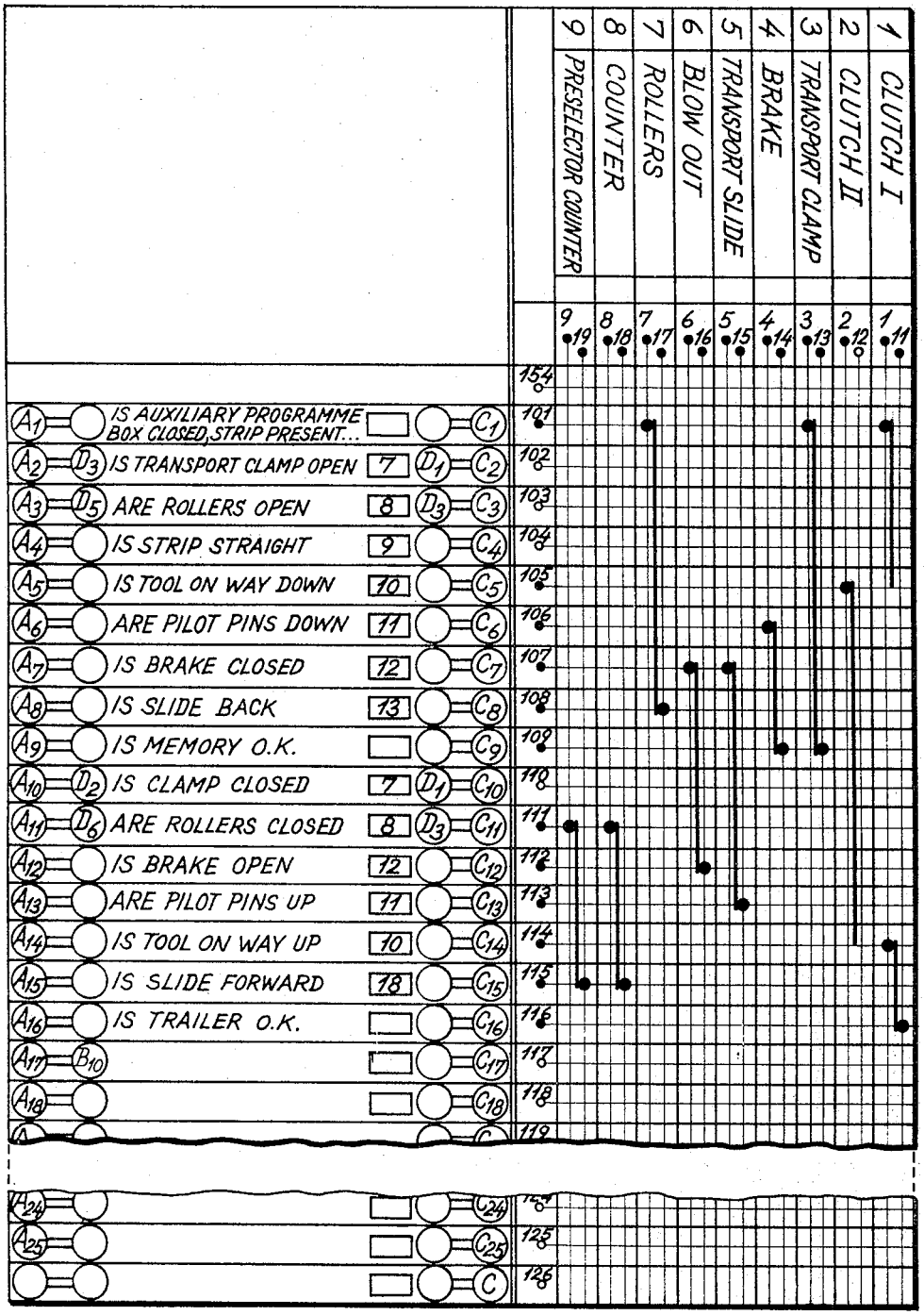
Figure 7:
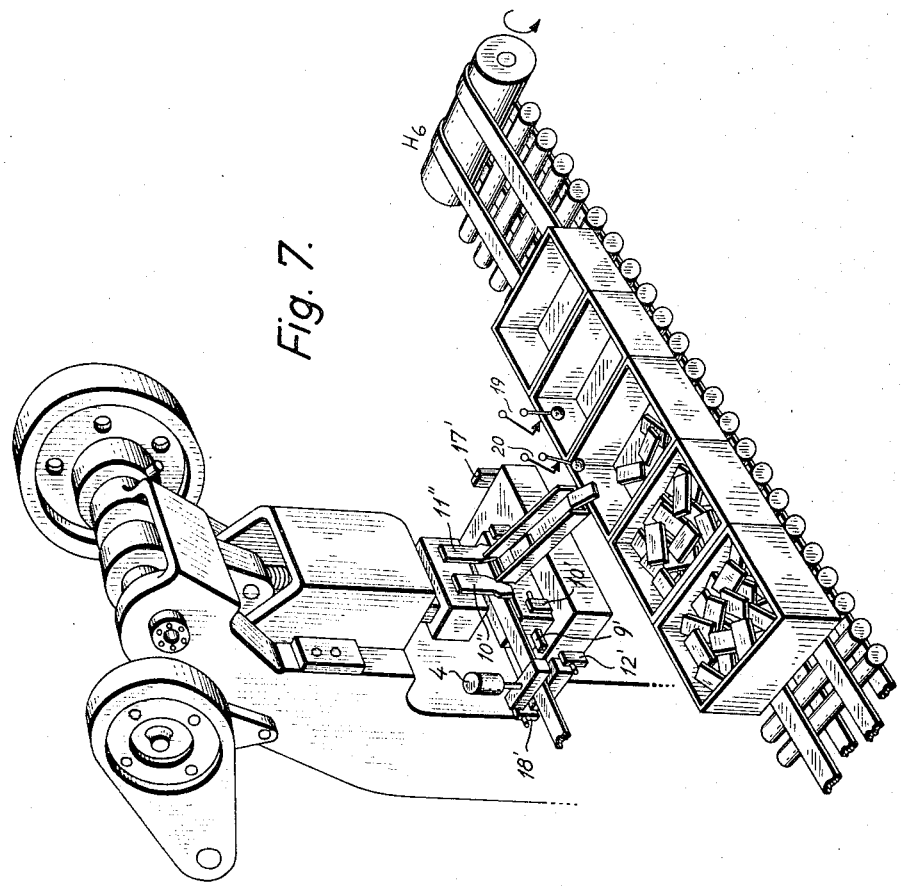
Figure 8:
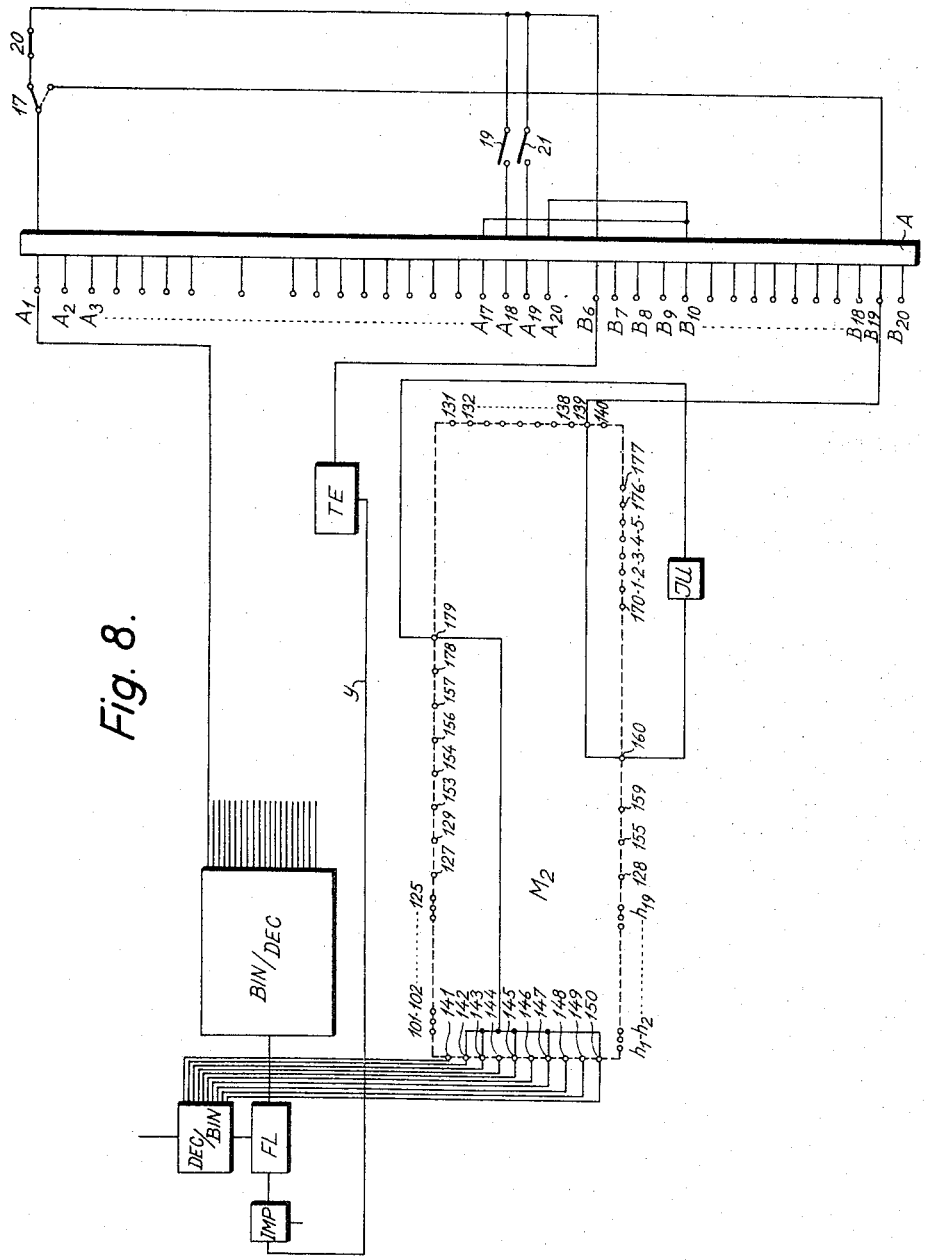
Figure 9:
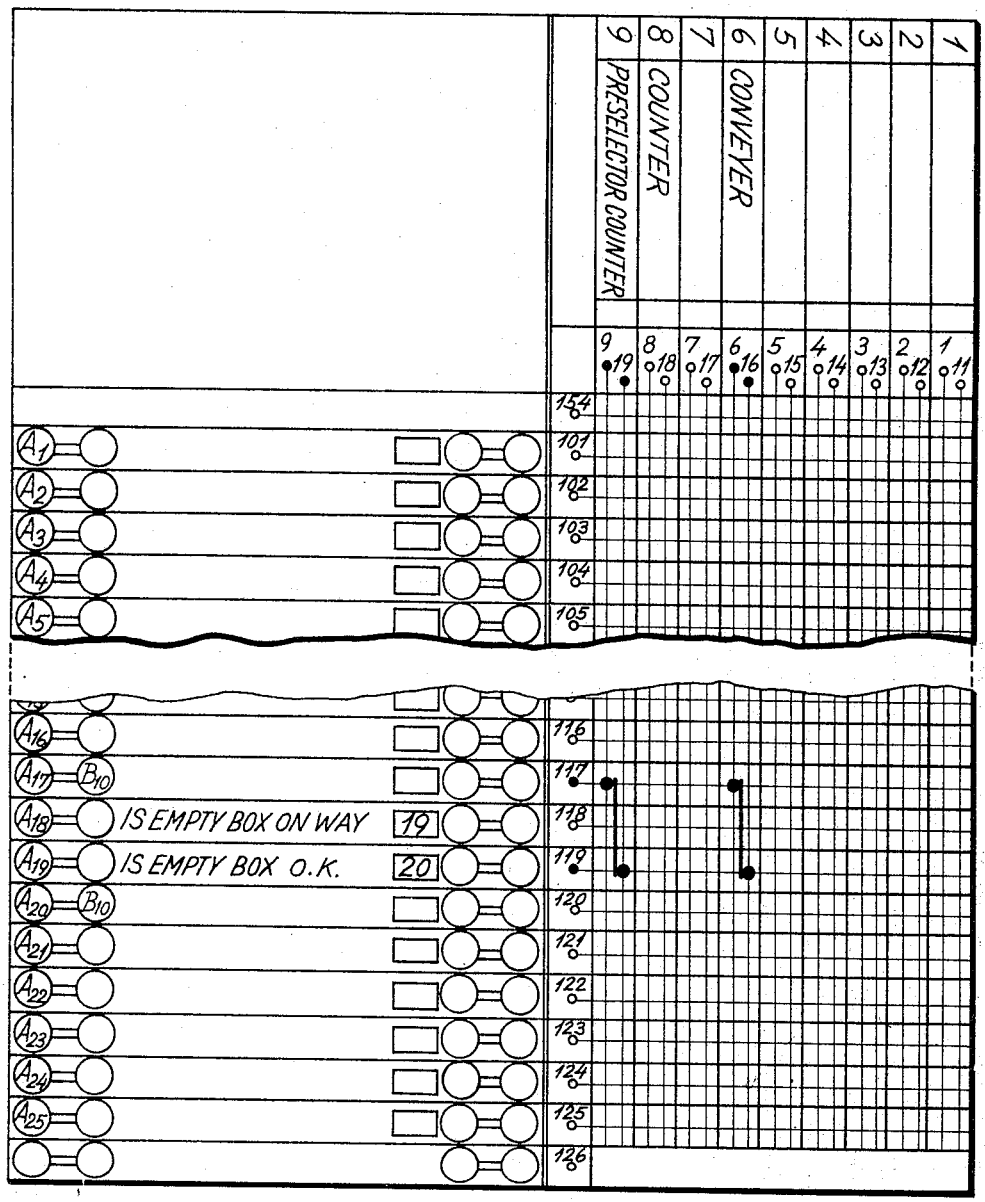

The invention will be further described in the following with reference to the accompanying drawing, in which FIGURE 1 is a schematic diagram showing a control unit for use in an automation arrangement according to the invention, FIGURE 2 is a schematic perspective view of a working machine illustrating the arrangement of action and sensing components with the connection of the action components, FIGURE 3 is a diagrammatic illustration of the wiring of the sensing system used on the machine of FIGURE 2 and illustrating the connection of a part of the machine sensing system with certain of the facilities included in the control unit of FIGURE 1, FIGURE 4 is a perspective view illustrating an embodiment of the manner in which the cross wirings are established, FIGURE 5 is a schematic view illustrating a manually operable switch arrangement for use on the machine and its connection with circuit portions of the control unit for enabling selected actions to be initiated or terminated under manual control, FIGURE 6 is a programme chart illustrating the correlation between sensings and actions on the machine of FIGURE 2, FIGURE 7 is a schematic view of the machine of FIGURE 2 showing further machine equipment added, FIGURE 8 is a schematic wiring diagramme of the additional sensings system added to that of FIGURE 3 when the additional equipment of FIGURE 7 has been added, and with an illustration of the connection with the control unit to utilize a further facility thereof, FIGURE 9 is a programme chart showing the additional correlation between sensings and actions for the additional equipment of FIGURE 7.

FIGURE 10 is a schematic diagrammatic illustration of a network adapted to be used for special purposes, and FIGURE 11 is a schematic diagrammatic illustration of a network adapted to be included in the general circuits for test purposes.

The basic principle of the sequence control arrangement illustrated in the accompanying drawings is that operation performing members or action members as well as sensing devices are mounted on the working machine.

The sensing devices produce signals to a control unit in which the sensing signals are processed and correlated to the actions or machine functions and the control unit issues start and stop commands to the machine function members.

Exhaustive disclosure of various embodiments of this system is found in my United Kingdom Patents Nos. 878,902 and 878,903 and corresponding foreign patents and patent applications as well as in my United Kingdom patent application No. 46,270/61 filed Dec. 27, 1961 and corresponding U.S. application Ser. No. 239,925, Patent No. 3,317,894. For the purpose of disclosure the disclosures of said United Kingdom Patents Nos. 878,902 and 878,903 and application Ser. No. 239,925 are hereby made disclosure of the present application.

The control unit of FIGURE 1 includes a plurality of circuit networks, the majority of which are described in my U.S. patent application Ser. No. 239,925 hereinbefore referred to.

A plurality of sensing signal output terminals $A_1$–$A_{25}$ are connected with a binary-to-decimal converter BIN/DEC which also has outputs to terminals 101–126 of a control unit distributor $M_1$ which is wired according to a programme chart to issue the commands to start or stop the actions on the working machine.

The commands to the machine actions are distributed through a plurality of command channels, in the example shown nine channels, having output terminals $H_1$–$H_9$. Command relays $RC_1$–$RC_9$ are provided each in one of the command channels. These relays include electronic networks as disclosed in my U.S. application Ser. No. 239,925 and are adapted to be energized to start the actions in response to input signals to one terminal from each of nine input terminals $h_1$–$h_9$ of the distributor $M_1$ and to stop the actions in response to input signals on another terminal each connected with input terminals $h_{11}$–$h_{19}$.

The binary-to-decimal converter BIN/DEC is connected with a flip-flop arrangement FL which in normal operation acts as a progressive switch arrangement and is switched by means of impulses produced in an impulse network IMP which is activated from data signals from the machine coming from an input terminal $B_6$ through a test circuit network TE and a line $y$ to the input of the impulse network IMP.

CRBR is a control network which includes a relay arrangement adapted to be switched on in response to actuation of a starter switch and to fall out in the case of any faults. This network which in the following will be referred to as the circuit breaker has a plurality of inputs and outputs.

A control unit terminal $B_7$ is an input terminal to the circuit breaker CRBR to a terminal 67 thereof.

One feature of the control unit of FIGURE 1 is that its distributor $M_1$ which is adapted to be cross wired to correlate the sensing signals which result in signals on the terminals 101–125 with command signals to the function channels by means of appropriate connections to the channel input terminals $h_1$–$h_9$ and $h_{11}$–$h_{19}$, in addition to these two sets of terminals, has other input and output terminals for various purposes as will appear from the following specification.

An output 27 from the circuit breaker CRBR is connected with a terminal 127 of the distributor $M_1$. In the distributor a permanent connection is made from the output terminal 127 to an input terminal 128 which through a line $f$ is connected with the binary-to-decimal converter BIN/DEC to render that decimal line operative which at each moment responds to the binary coding of the flip flops FL.

An input terminal 153 is through a line $p$ connected with the control unit terminal $B_8$ which is connected with plus output from a power pack (not shown) by means of which the whole system is energized. Thereby the output terminal 153 is permanently available in the distributor as a supply for auxiliary equipment included in the control unit when such equipment is going to be included in the circuits for a specific programme purpose.

154 is an output terminal of the distributor $M_1$ connected with the test circuit network TE by way of line $y'$ activated independently of the sequence. If for example a specific machine function which is included in a command channel has to be switched on as a general condition and retained, the output terminal 154 should be connected with the start terminal of the control relay in the corresponding channel.

156 is an output terminal in the control unit distributor $M_1$ connected with a corresponding output terminal 56 on the circuit breaker CRBR on which a signal occurs when the circuit breaker falls out.

157 is an output terminal of the distributor $M_1$ connected with a corresponding output terminal 57 of the circuit breaker CRBR on which a short direct current signal occurs when the circuit breaker is switched on.

A permanent wiring is made between the output terminal 157 and the output terminal 129 and also an input terminal 159 which is connected with a general input terminal $B_{10}$ as well as through a network ZR included in a line $z$ with the input of a network DEC/BIN which is a decimal binary converter which is connected with the flip flop circuitry FL.

The binary decimal converter BIN/DEC in its turn is connected by way of a line $m_1$ with an input 61 of the circuit breaker CRBR and through a network CC with an input 62 thereof.

The circuit breaker CRBR furthermore has an output $c_1$ which is connected with the input of the decimal binary converter DEC/BIN as well as with an input $i_1$ of the impulse network IMP.

These various connections operate substantially as follows:

When the circuit breaker CRBR is switched on, the direct current signal from the output 57 which only lasts until the relay has established its own holding circuit gives through the permanent connection between the output terminal 157 and the input terminal 159 through the line $z$ and the network ZR a reset signal to the flip flops will be reset to enable decimal line No. 1 to be rendered effective. In addition to this a signal from the output $c_1$ of the circuit breaker CRBR is applied to the input terminal $i_1$ of the impulse network or line shift circuit IMP and causes a temporary inhibition thereof for line shift in response to signal from the input terminal $B_6$, the test circuit network TE and the line $y$.

The connection from the terminal 27 of the circuit breaker CRBR through the input terminal 127 to the output terminal 128 and to the binary decimal converter BIN/DEC provides in connection with the line $m_1$ from the binary decimal converter to the network CC and the connection from the output 61 of the circuit breaker that if more than a predetermined current is drawn through the system, or if more than one decimal line is rendered effective at the same time, the network CC will give an input on the terminal 62 of the circuit breaker whereby the circuit breaker will fall out.

The system briefly described hereinbefore has 25 sensing lines and as apparent the 26th line is connected with the input terminal 129 which by means of its permanent connection to the output terminal 159 results in a reset signal through the line $z$ so that when the full programme is utilized with all 25 sensing lines the system will automatically reset itself.

In case of a smaller programme with less than 25 sensing lines utilized as apparent from the following example, the sensing line subsequent to that last used for a sensing of the machine must be connected with the terminal $B_{10}$ so that through this and its connection to the zero reset network ZR a reset signal is given.

As obvious from the foregoing an inhibition signal is always given from the output $c_1$ of the circuit breaker CRBR in the event that it falls out.

In addition the distributor $M_1$ of the control unit has a plurality of other terminals for specific purposes.

One series of terminals marked 170–176 is connected with a network ME which is schematically illustrated as a double switch having one switch connected between the terminals 173 and 174 and another switch connected between the terminals 175 and 176 with activator members connected with the terminals 171 and 172 respectively so that if a signal is applied to the terminal 172, the right hand switch is closed and the left hand switch is opened as indicated, while when a signal is applied to the terminal 171 the left hand switch will be closed and the right hand switch opened. The terminal 170 is a voltage supply terminal for this network which in practice may be a transistorized electronic network with bi-stable circuits.

The network ME will in the following be referred to as the memory circuit because it can be connected in a manner to be more fully described in the following with a sensing device on the working machine in such a manner that one of the memory switches is closed in response to the activation of the sensing device on the machine. The memory switch is then included in a later line of the sensing system and will, if it has been closed give the programmed data signal back to the line $y$.

In the example here illustrated one memory is included in the control unit but as will be apparent from the following example it is possible to use more than one memory in a programme in order to obtain certain advantages.

A further input terminal 177 is connected with a network SD, the other end of which is connected with an output terminal 178 of distributor $M_1$. Also the network SD is an electronic network which in principle comprises a switch to which a permanent plus is applied and which is opened if a signal is applied to the input terminal 177 but which gives its plus signal to the output terminal 178 if it is closed because the input to the terminal 177 disappears.

Eventually the schematic control unit circuit of FIGURE 1 includes a network JU which is connected with an input terminal 160 of the distributor $M_1$ and with an output terminal 179 of the distributor $M_1$. In addition the JU network is connected with the inhibition lines.

In principle the JU network is a bistable network in similarity with the networks ZR and CC so that when a signal is applied to the input terminal 160 an output signal will occur on the terminal 179. The JU network will in the following be referred to as the "jump" network because it can be used for setting the flip flops to render a predetermined decimal line effective by connecting the jump output 179 with appropriate five terminals of a total of ten terminals 141–150 which are connected with the decimal-to-binary converter DEC/BIN according to a predetermined coding.

In the example only one jump circuit is included in the control unit, but it will be obvious that if it is desired to "jump" for action in more than one channel a further jump circuit must be included in the same manner as a further memory will have to be included for memory action in more than one line.

Eventually, the control unit has a plurality of exterior terminals numbered $B_{11}$–$B_{20}$ which are connected with corresponding terminals 131–140 of the distributor $M_1$.

In the following example of providing sequence control of a working machine by means of the control unit having its circuit substantially as hereinbefore described a stamping press is used as schematically illustrated in FIGURE 2.

The feed control of the stamping press is disclosed in my copending. United Kingdom patent application 20,205/54 filed June 12, 1959 and corresponding U.S. application Ser. No. 35,252 now U.S. Patent 3,229,556, which are also made part of the disclosure of the present invention.

The main function memebr of the stamping press is of course a magnetic clutch S which when energized and de-energized connects the flywheel with the reciprocable member that carries the matrix tool.

Presses of this kind can usually be set for continuous operation provided that a feed control for the strip is used usually controlled mechanically from the press.

In such event the operator who usually has to depress two handles watches the operation of the press while keeping both handles depressed and if something goes wrong the operator is supposed to stop the press by releasing the handles immediately whereby the main clutch S is de-energized to disconnect the driving connection between the flywheel and the reciprocable parts of the press.

Everybody familiar with presses knows that faults in the feed control which are one of the most frequent sources of damages occur so quickly that it is an exception when the operator manages to stop the press before something has happened and many times that which has happened is that a pilot pin has broken and damaged the stamping tool which requires demounting of the tool, a repair of the tool which frequently takes weeks and a decision from the management for which other purpose the press has to be used until the tool can be mounted again, i.e. in total a loss of continuity of production.

In the example to be described in the following a safeguarding against this sort of events is obtained as well as the possibilities of running the press continuously with disengagement of the clutch if something happens which does not condition the press for continuing its downwards stroke to enter the pilot pins into the workpiece.

In the example shown the press is provided with the following functions in adidtion to the clutch S.

The strip to be forwarded has to be transported which is caused by means of a clamping device having associated therewith an auxiliary clamping device operable as a trailer as disclosed in my U.S. Patent 3,229,556 and designated by 3 to be started and stopped in the same operation channel from the control unit.

When the strip has been forwarded a brake 4 becomes effective to positively stop the movement of the strip during the stamping action. This is the action in channel 4 controlled from the control unit.

The stroke of the clamping device is controlled by means of a cylinder 5 which is actuated in channel 5 from the control unit.

A device comprising a plurality of rollers is arranged before the transport device and adapted to straighten the band to be substantially flat and the actuation member for rendering the rollers effective and releasing rollers is referred to as 7 and controlled in channel 7 from the control unit.

When the article has been stamped out by means of the tool a pressure air nozzle is opened by means of a solenoid valve referred to by 6 to blow out the workpiece. This is the action in channel 6 controlled from the control unit.

In working machines and especially presses it is often desired to count the number of articles produced and for this purpose a counter 8 is included in the number of operations and connected in channel 8 of the programme controlled from the control unit.

In many working machines, especially stamping presses, it is often desired to produce a predetermined number of items and then stop the production to check whether the items are still satisfactory and to this purpose a preselector counter is included in the circuitry having an actuating member referred to by 9 included in channel 9 of the programme controlled from the control unit, and adapted to open a sensing switch referred to by 17 after a predetermined number of countings, for example 2000.

As apparent from FIGURE 2 the clamping actions of the main clamping member as well as the trailer are connected in channel 3, the brake in channel 4, the stroke of the clamping device in channel 5, the blowing out in channel 6, the strip straightening rollers in channel 7, the counter in channel 8 and the preselector counter action in channel 9.

In the foregoing the clutch has not been mentioned.

The clutch, however, is connected in channel 1 and channel 2 as indicated diagrammatically with the lower end of the clutch solenoid being connected to the common terminal 10 and the top end of the solenoid being connected to the machine inputs $H'_1$ and $H'_2$.

In order to explain the reason for this it must be remembered that the programming of any machine is based on the neutral position of the various actions when the machine is switched on.

Before the pilot pins can be permitted to enter the strip the following conditions must be fulfilled:

The clamping device must be open
The straightening rollers must be released, and
The strip must be straight.

In accordance with the general outline of the system according to my inventions, as disclosed in my United Kingdom patents and patent applications referred to hereinbefore, a sensing device or microswitch is provided to sense each exterior position of a movable member and in addition independent sensing members are provided to produce data signals on other things which are necessary to condition the machine for the start or stop of an action.

The sensings of exterior positions can usually be made by means of microswitches and insofar as the sensing which is supposed to close a data signal line when for example the straightening rollers are activated can be obtained by closing of a microswitch 8 when the latter is mechanically activated, the sensing "that the straightening rollers are released" can be obtained by means of the opposite position of the same microswitch i.e. when the latter is mechanically inactivated.

In a similar manner as apparent from FIGURE 2 the sensing of the opening and closing of the clamping device is caused by means of a switch 7'. That the pilot pins have been brought down into the matrix is sensed by means of a microswitch 11' which is actuated by means of a cam 11" associated with the movable part of the tool, and when the pilot pins during the outward stroke of the press have been brought free of the tool this is sensed by means of the same microswitch 11'. The closing and opening of the brake—action 4—is sensed by means of a microswitch 12', and the movement forward and back of the stroke when the clamping device is closed on the strip is sensed by means of a microswitch 13'.

The stroke of the press, however, is independent of the transport of the strip which is supposed to be sequence controlled because the downward stroke of the tool depends on the velocity of the flywheel only.

According to the example the sequence control of the strip feed is coordinated with the velocity control of the stamping tool or flywheel.

In a press in which the feed control is taken mechanically from the main shaft, it is not possible to utilize more than 180° rotation of the main shaft for the feed control, and if for example the angle of rotation of the main shaft during which the tool is effective is 60°, there will be a rotation angle of 120° during which nothing can happen, i.e. a substantial part of the rotation of the main shaft will be ineffective.

By making the feed control subject to a sequence control independent of the rotation of the main shaft, it is rendered possible to utilize the ineffective time of the rotation of the main shaft or stroke of the tool for the feed of the strip to thereby obtain more smooth movements including more smooth halting of the strip which increases the safety and the accuracy of the feed.

Therefore the auxiliary fraction represented by the feed is made sequence controlled independent of the timed movement of the press.

The invention, however, assures that that point of the time controlled stroke at which the pilot pins enter the strip is rendered conditional upon the fulfillment of all the conditions of the preceding part of the sequence control.

For this purpose the stroke of the press is included in the sequence control in the form of two operations or actions, and since in a press having an electromagnetic clutch the action is represented by means of the effective connection of this clutch it is the clutch-connection which is included in two subsequent channels.

This is made in that way that one action runs from a suitable high position of the stamping tool, for example from the top, to a point slightly before the pilot pins will enter the strip. The next action starts from this point and continues to the top position which in the example is the end of the next action.

On the press itself the action is the same, namely that which renders effective the magnetic clutch which connects the flywheel with the main shaft.

This action, namely to render the magnetic clutch effective, is the same on the machine insofar as it only requires that the clutch S is rendered effective or energized.

This energization is, however, according to the invention rendered reversed precisely at that point before the pilot pins enter the material strip. In other words, the energization of the magnetic clutch is split into two subsequent actions or operations between which there is a sharp demarcation which can cause the first stage of the action to be stopped precisely before the pilot pins enter the strip.

When the feed sequence control is analysed from the angle that the downstroke of the tool can be stopped with sufficient accuracy to prevent the pilot pins from entering the strip if one or more conditions are not fulfilled, it is found that the conditions the clamp must be open
the rollers must be ineffective, and
the strip must be straight must be fulfilled.

It will be allowable to let the tool go down to near the point where the pilot pins enter the strip while these sensing operations are allowed to be performed but if only one of these sensings has not resulted in "yes" answer to the control unit, it must be assured that the press is stopped.

In order to stop the press at this stage which is a velocity control operation, it is necessary that the magnetic clutch gets a stop signal at this point.

The difference between a press and any other sequence controlled machine is that in the sequence controlled machine a programme is stopped automatically if one or more conditions for the continuation of the programme are not fulfilled. And a machine in which a movement is controlled by means of an outside source like in a press the movement will, however, continue unless a stop signal is given.

It is therefore not possible to allow the three sensing operations mentioned hereinbefore to release a continuation signal to the next part of the stroke of the press because this would not be possible. If, for example, the rollers have not been released due to failure of the operation of the action member in channel 7 this will have no influence whatsoever on the continuous movement of the press if a signal to continue the movement only is given.

As apparent from the following example it would not give any safety if the sensings had found that the clamp had not been opened or that the rollers had not been released. This would in fact stop the progressive switch arrangement at stage 2 or stage 3 but the velocity controlled press would not be able to feel this unless the stopping of the programme prior to the position in which the pilot pins are about entering into the strip results in a positive signal to the magnetic clutch to disengage the flywheel from the main shaft.

For this purpose a pilot pin position switch 10′ is provided on the machine adapted to be actuated by means of a cam 10″ on the reciprocable part of the machine.

This switch 10′ is connected with the control unit to give a positive stop or switch-off signal to the magnetic clutch when the switch is activated and simultaneously to include a "synthetic" switch in that programme line which corresponds to the activation of the switch 10′. By the closing of this "synthetic" switch the sensing circuit through the line in question will be closed in the same manner as if the switch 10′ had been included in the line in question, but if the progressive switch arrangement has not reached the line in question, for example because the rollers have not been released or the clamp has not been opened as hereinbefore mentioned, the progressive switch arrangement will have stopped before the line in question and the line will not be rendered operative so that even the closing of the "synthetic" switch will not cause a positive start to the second part of the magnetic clutch which is included in channel 2 and therefore the press will stop.

This description of the manner in which the problems of the press are solved will be more clearly understood from the circuit arrangement of FIGURES 3 which shows the sensing circuits through the various sensing switches of the machine illustrated in FIGURE 2 together with its connections with the control unit in which the memory of the control unit is utilized as that switch which operates as a "synthetic" switch for the switch 10′.

In addition to the various switches referred to hereinbefore a few other switches are mounted on the machine, namely A switch 19′, FIGS. 2 and 3, which is included in an auxiliary programme box, the structure and operation of which will be explained in more detail in the following, An "independent" feeler switch 4′ adapted to feel whether the strip is present, and arranged between the straightening rollers and the feed device, A switch 17′ adapted to be opened when the counter in channel 9 has counted that for example 2000 items have been produced, and A main starter switch 20′ (FIG. 3).

As will be obvious none of these four switches 19′, 4′, 17′ and 20′ will be opened during the normal sequence. The switch 19′ will only be opened when the desired number of items has been produced. The switch 4′ will only be opened when the strip has been used up and the switches 19′ and 20′ will only be opened if manually activated for example in the event that the main starter switch on the machine is opened or the auxiliary programme box is opened.

It is therefore possible to include all these four switches in series in the first line of the programme and obviously opening of one of the switches will result in stop of the programme in line 1. This means for example that if the end of the strip passes switch 4′ during the feed stroke of the strip, this will not stop the press until the cycle has been completed, and in the same manner if the counter has counted that the desired number, e.g. 2000 items have been produced which results in opening of the switch 19′ this will not stop the press in the middle of the programme but allow the cycle to be completed and stop the press before the next item is started.

As hereinbefore mentioned a connection between the control unit terminals $B_7$ and $B_8$ (FIG. 1) of which the terminal $B_8$ is the general positive terminal is always required in order to switch on the control unit by providing plus to the terminal 67 of the circuit breaker network CRBR.

In order to utilize this condition of the control unit a safety circuit between terminals $B'_7$ and $B'_8$ is included on the machine which comprises an emergency pushbutton N in series with a machine guard arrangement G which in the embodiment shown comprises a socket so adapted to have plugged in connector pins of a guard which protects the movable parts of the press from being touched. If the emergency push button N is actuated this breaks the connection between the terminals $B'_7$ and $B'_8$ and if the machine guard G is removed or by suitable construction of the machine guard if the same is broken, this also breaks the safety circuit between the terminals $B'_7$ and $B'_8$ when the circuit breaker and the control unit drops out and the cycle stops immediately with that sensing line still being effective which was effective when the circuit was broken because the inhibition signal will be applied to the line shift circuit.

In the diagrammatic illustration of FIGURE 3 the terminals of the machine equipment are referred to by the same reference numerals as the terminals of the control unit with index '.

The terminals are connected with the various sensing devices through a distributor referred to as $M_2$, the structure of which is similar to the structure of the control unit distributor $M_1$ and which will be referred to in more detail in the following.

Without reference to the distributor the connections of the circuit of FIGURE 3 are as follows.

In line 1 the three sensing operations, namely the auxiliary programme box 19', the presence of strip 4', and the continuing closing of total number counter 17' up to the desired number as well as the main machine switch 20' are connected in series and with the common input terminal $B'_6$ which, when all the four switches in line 1 are closed, will give a "yes" answer to step the progressive switch arrangement to line 2.

Regarding the correlation between sensing and actions and with reference to the programme chart of FIGURE 6 which includes details to be more fully described with reference to the distributor arrangements of FIGURE 4, is is supposed that the "normal" position of the clamping devices, the rollers and the magnetic clutch is the "closed" position of the clamping devices and the rollers, and the "disengaged" position of the magnetic clutch.

It is therefore possible to start the actions in channel 1, 3 and 7 already in line 1, i.e. engaging the magnetic clutch to cause the press to move, open the clamping device and disengage the rollers.

Before the pilot pins enter the material, the sensings that the clamping is open the rollers have been disengaged, and the independent sensing that the strip has been straightened, namely by means of the sensing switch 9' must be carried out and since each of these sensings requires a stage they are introduced in lines 2, 3 and 4 respectively as indicated on the programme chart in a similar manner as sensings have been introduced in programme charts in the patents and patent applications referred to hereinbefore.

As mentioned hereinabove the following sensing "that the tool is on its way down" must in addition to a "yes" answer to this question provide a safeguarding that the three preceding questions in lines 2, 3 and 4 have been answered with "yes" and if not, make sure that the press is stopped.

For this purpose the switch 10' utilizes as "synthetic" switch the memory ME of the control unit as indicated in FIGURE 3, for which purpose the switch 10', which before the press comes down is in the position shown in full lines, is connected through the spare lines connected with the terminals $B'_{11}$ and $B'_{12}$ to the terminals 131 and 132 of the control unit distributor. The terminal $A'_5$ of the machine equipment is connected through another one of the spare terminals $B'_{17}$ to the terminal 137 of the control unit distributor $M_2$.

In the control unit distributor $M_2$ the following cross connections are provided:

In order to render the memory operative the plus input terminal 153 is connected with the memory input terminal 170. The terminals 131 and 132 are connected with the memory input terminals 171 and 172. Hereby when the switch 10' is thrown over to the position indicated in dotted lines, the left hand switch of the memory ME is closed and the right hand switch opened, which closes the circuit through line 5 between the machine terminal $A'_5$, the spare terminal $B'_{17}$, the control unit distributor terminal 137 to the memory input terminal 173 which is connected by way of terminal 174 with output terminal 155 of the control unit distributor which as mentioned hereinbefore is connected with the line y by way of test circuit network TE.

The terminal 131 of the control unit distributor is also connected with the stop input terminal $h_{11}$ of the control relay $RC_1$ in channel 1 whereby the main press clutch is de-energized. If, however, the preceding sensing in lines 2, 3 and 4 have been fulfilled and the progressive switch arrangement, i.e., the flip-flops have activated line 5, the closing of the left hand memory switch which in the manner described is included in line 5 causes, due to the action connections of the control unit distributor indicated by the programme chart of FIGURE 6, the switching on of the main press clutch but this time in channel 2 so that the press continues its movement uninterrupted.

If, however, the strip has not been straightened sufficiently or the rollers have not been released or the clamping has not been opened, the flip-flop progressive switch arrangement will have stopped in one of the lines 2, 3 or 4 with the result that line 5 will not have been rendered operative whereby the closing of the left hand switch of the memory will have no effect and the cutting off signal from the terminal 131 will be that which governs the control and results in stoppage of the press.

The subsequent sensing in line 6 by means of the switch 11' gives the usual data that the pilot pins have been moved down whereafter switch 12' in line 7 gives the data that the brake has been closed and switch 13' in line 8 gives the data that the transport has been moved back. These are actions which as indicated in the programme chart of FIGURE 6 can be allowed to be started in channels 4 and 5 during the stamping operation without interfering therewith.

The transport device has as indicated in FIGURE 2 a main clamping device and a trailer device as described in more detail in my U.S. Patent 3,229,556 and referred to hereinbefore as being made part of the disclosure of this application. A switch 14' is included in this transport device adapted to be actuated, for example, opened if the main transport clamp skids on the strip and thereby moves relatively to the trailer clamping device. It is not possible to aforesee at which point of the transport a relative movement of the main transport device and the trailer device, if any, may take place and it is therefore not possible to introduce the sensing of opening of the switch 14' in any definite line of the programme. In addition it is only necessary to know whether the main transport has skidded on the strip, i.e. whether the switch 14 has been opened, but it is not necessary to have the answer to this question until the press starts to move down again, and it is neither possible to give the answer to this question until the transport has reached its forward position.

Theoretically the switch 14' could be included in series with the switch 18' which is closed when the transport has reached its forward position. This solution does not provide complete safety, however, because it complicates location of faults in the line in which the switch 18' is closed. In addition, it is possible that the main clamp has moved slightly relatively to the trailer clamp sufficiently to open the switch 14' but not more than this switch is closed again due to the inertia of the trailer when this is retarded. It is therefore important to check whether the switch 14' has been opened during the transport and to include this sensing in the programme after it has been sensed that the transport has been forwarded.

To this purpose the trailer switch 14' is simulated by means of a switch of a "memory" which is of the same kind as the memory included in the control unit. This memory is shown in FIGURE 3 included with one of its switches in line 9. The switching of the memory is caused by the closed path through the switch 14' and the reverse position of the memory is conditioned before the line in which the sensing is necessary. The conditioned condition is programmed as a sensing in line 11 that the "memory" is in order.

When line 8 is rendered operative, a signal is branched off through a valve or diode from line 8 to the "memory" which is conditioned in the position shown in full lines. Hereby the lower switch of the "memory" is closed. This has the purpose of checking that the "memory" is in order because otherwise the "memory" would remain in the position which corresponds to the switch 14' remaining closed. The conditioning of the memory therefore corresponds to the check that a throw-out control, for example by means of a photo-cell is in order after throw-out of a workpiece has taken place.

The answer that the "memory" is conditioned is given in line 9.

Hereafter the different movements are reversed, i.e. the clamp must be closed, the rollers must be activated, the brake must be opened, and it must be sensed that the pilot pins have been moved up and that the tool is on its way out.

In line 11 the roller sensing switch is used in its other position and in addition line 11 is branched off through a valve or diode to the "memory" included in line 9 to condition the memory, i.e. to reverse the position of its two switches to give a "yes" answer later that the trailer switch has remained open. If, however, the switch has been closed, the "memory" will as apparent from FIGURE 3 be reset to the position shown in full lines.

In line 12 the other position of the brake sensing switch 12' is used again and in line 13 the other position of the pilot pin sensing switch 11' is used again.

When thereafter the press is on its way up, the switch 10' is again switched over to the position shown in dotted lines which causes the opposite of the procedure described hereinbefore, namely through the distributor of the unit $M_2$ to switch off the signal to the relay in channel 2. In line 14 the machine terminal $A'_{14}$ is connected with the terminal $B'_{18}$. The signal on the terminal 132 causes the reversing of the position of the "memory" in the control unit and thereby in line 14 through $B'_{18}$, terminal 138 and the right hand part of the "memory" signal to the y-line, provided, however, that the preceding sensings in the lines 11, 12 and 13 have been fulfilled, i.e. the opposite sensings of those in lines 2, 3 and 4.

The "normal" position of the transport is the back position which means that the stop of the action in channel 5 in line 13 means that the transport moves forward. It is only during the forward movement that it is necessary to check whether the switch 14' might have been opened. This check can be made simultaneously with the check in line 14 by means of the "memory" in the control unit that the press is on its way up and the command signal in this line to channel 1 to enable the press to continue its movement.

In line 15 the sensing is made that the transport has been moved forward.

From both of the lines 14 and 15 connections are branched off through valves or diodes to the trailer switch 14'. If in any of these lines this switch should have been closed because the main transport device has skidded on the strip, this will in any of the lines $a_{14}$ and $a_{15}$ cause a resetting of the "memory" to the position shown in full lines with the result that in this event the upper memory switch will be found open in line 16 which will result in the programme being stopped. If, however, the switch 14' has not been opened, the "memory" will remain in the opposite position of that shown in full lines, namely the position to which it was conditioned in line 11 and the upper switch will be closed as an indication of a "yes" answer in line 16 to the question whether the trailer switch 14' has remained open during movements which otherwise would be difficult to ascertain.

The distributor $M_1$ of the control unit as well as the distributor $M_2$ of the machine equipment are preferably both constructed in the form of a plugboard as indicated in FIGURE 4.

The plugboard has a fixed plate $P_1$ with a plurality of holes adapted to have sockets inserted therein. For permanent connection to the terminals $a'_1$–$a'_{20}$ etc., sockets which are prewired to terminals of this connector socket may be provided in two lines referred to by A and B with identification numbers from 1–20.

In order to enable all possible connections with the microswitches the principle of the plugboard is that each microswitch as exemplified in FIGURE 4 by means of the switches 7 and 8 is wired to three sockets inserted in holes of the fixed plugboard plate and identified by numbers so that for example in a wiring schedule completed by the electrician it can be identified that the standard coded terminals of switch No. 7 marked 1, 2 and 3 are connected with sockets inserted in holes marked $D_1$, $D_2$ and $D_3$ of the fixed plugboard plate $P_1$.

In a similar manner as indicated the standard coded terminals 1, 2 and 3 of switch No. 8 are connected with sockets inserted in $D_4$, $D_5$ and $D_6$ of the fixed plugboard plate.

As apparent from the programme chat switch number 7 must be included in line No. 2, i.e. connected with terminal $a_2$. Since all the return lines have to be connected with the terminal $B'_6$ and it will be obvious in practice to provide so many connections, a special row of return line sockets is provided on the fixed plate $P_1$ marked C and adapted all to be connected with the terminal $B'_6$.

In order to provide the connection with switch No. 7 which as apparent from the programme chart is included in line 2 and line 10 as well as with the switch 8 which as apparent from the programme chart is included in lines 3 and 11 and with all the sensing components of the machine equipment, a loose plugboard plate $P_2$ having corresponding holes is used and adapted to have inserted therein sockets which are connected with leads. As shown in FIGURE 4 a lead having three sockets is provided with the sockets inserted in $C_1$, $D_1$ and $D_4$ to connect terminal 1 of the switches 7 and 8 with the common return lead. Other sockets connected with a single lead are inserted to establish connection between $A_2$ and $D_3$, $A_3$ and $D_5$, $A_{10}$ and $D_2$ and $A_{11}$ and $D_6$.

When the loose plugboard plate is placed in position over the fixed plugboard plate and pins as indicated are inserted through all the sockets, the electrical connections will be established as hereinbefore mentioned.

As will be obvious from FIGURE 4 the construction of the two distributors in the form of plugboards enables each terminal of each component to be identified and these identifications can be introduced on the programme chart.

The programme chart of FIG. 6 is preprinted with the 25 output terminals marked in the left hand vertical column and the C-terminals which are adapted to be connected with the input terminal $B_6$ marked in the right hand column.

In each line there is furthermore a rectangle which represents the component whatever this is, for instance, a microswitch or a part of a "memory." Adjacent the premarked vertical columns the programme chart has open columns of circles adapted to have introduced therein the plugboard identifications of each component such as exemplified in FIGURE 6 in conformity with the connections of FIGURE 4.

In the foregoing the connection of the safety device SD has not been mentioned.

As apparent from the description the connections between the stop terminals in channel 1 and channel 2 and the switch 10′ result in a stop command in these channels at positions of the movable part of the press which are determined by the position of the switch 10′ and its actuation member. In other words the stop commands are given outside the programme while the start commands are included in the sequence programme in that the signals on the terminals 131 and 132 also result in conditioning of the "memory."

In a stamping press it is, however, important that the stop commands are given at the aforeseen positions. This would not be the case if a fault occurs in the switch 10′ or its connection with the voltage supply terminal $B_8$ becomes defective. Since this part of the installation is on the working machine, it must be assured that defects of this kind cannot result in continuation of the press movement if the press should have been stopped.

For this purpose the switch 10′ is connected (FIG. 3) to give a signal to the input terminal 177 of the safety device SD in both positions, namely from the control unit plugboard terminals 131 and 132 through each of a pair of valves or diodes. The output terminal 178 of the safety device is in its turn connected through two valves or diodes with each of the stop input terminals $h_{11}$ and $h_{12}$ of channel 1 and channel 2.

Obviously as long as the switch 10′ functions correctly there will simultaneously with the alternative stop inputs on the terminals $h_{11}$ and $h_{12}$ be supplied an input signal to the safety device SD whereby the switch thereof will be kept open. If, however, the switch 10′ becomes defective or its connection with the supply terminal $B_8$ breaks or opens, the input signal on the terminal 177 of the safety device SD will disappear whereby the switch which is included in the safety device will be closed and from the permanent plus of the safety device will result in an output signal on the terminal 78 and thereby signal on both channel 1 and channel 2 to stop.

As obvious from the foregoing the press will operate automatically in sequence according to the programme plan and with the exception of immediate stop which can be caused by pressing the emergency push-button N or removing or breaking the guard G, the press will continue its automatic cycle until one of the four switches 19′, 4′, 17′, 20′ in line 1 is opened. If for example the desired number of articles has been stamped out the switch of the preselector counter opens and the press stops with the programme in line 1.

The normal reason for stopping will be that the switch 4′ which indicates that material is present is opened when the end of the strip passes the actuator member of that switch.

A new strip should then be inserted in the press which, however, as apparent from the programme chart requires opening of the clamp and release of the rollers, i.e., activation of the functions in channels 3 and 7 because the "normal" position of the clamp and rollers is the "closed" position.

The auxiliary programme box enables commands to the channels to be given outside the normal programme where it becomes necessary and the auxiliary programme box together with its connections to activate channels 3 and 7 to open the clamp and rollers to enable a new strip to be inserted is schematically illustrated in FIGURE 5.

The auxiliary programme is performed in line 1 of the main programme when for example the switch 4′ is opened.

In the auxiliary programme box a switch is provided which when the box is closed, is closed by means of an actuating pin or the like and it is that switch in line 1 which is nearest the terminal $A'_1$. When as shown in FIGURE 5 the auxiliary programme box is opened the switch 19′ is thrown over and connects thereby the terminal $A'_1$ in the manner indicated in FIGURE 5 with all the left hand terminals of three push-button operated double-switches.

In the present case where only operation of two channels is required, only the two of these double-switches are used and the right hand terminals must be connected with the channels in question.

For this purpose a further number of the terminals marked $B'_{11}$–$B'_{20}$ are used, in the present case the terminals $B'_{13}$–$B'_{16}$ which are connected with the push-button switch terminals in the manner shown in FIGURE 5. This causes a connection with the control unit plugboard terminals 133–136 and from these terminals connections in the unit plugboard are made through valves or diodes to the relays of channel 3 and channel 7.

As will be obvious from FIGURE 5 a depression of the two upper push-buttons in the auxiliary programme box will cause a start signal to the actions in channel 3 and channel 7 and thereby cause the transport clamp and the rollers to be opened so that a new strip can be inserted. When the two push-buttons are released to the position shown in FIGURE 5 this causes a stop signal to the two channels so that when the auxiliary programme box is closed the two channels will be inactivated and conditioned for being activated in accordance with the normal programme which thereafter is started again.

In the foregoing valves or diodes have been shown inserted at various places. The general rule is that if a sensing line includes connections to two or more action channels, each connection must be made through a valve or diode in order to prevent feed back from other parts of the circuit.

Preferably these valves are provided in a convenient number in the unit plugboard as well as in the machine plugboard and preconnected with terminals with identification numbers therefor so as to enable all the connections to be drawn up schematically.

As disclosed in my United Kingdom Patents 878,902 and 878,903 the versatility of the system enables the addition of a programme to be carried out controlled automatically from another control unit in response to conditions which only occur after a predetermined number of complete programme cycles.

The "jump" facility according to the example described hereinbefore provides, however, for including such an extra programme to be controlled by means of the same control unit.

In FIGURE 7 an extra machine equipment is shown in the form of a conveyor adapted to transport boxes in sequence to position to be filled with a predetermined number of articles thrown out from the stamping press.

It is supposed that this conveyor device must be included automatically in the programme in such a manner that each time, for example 500 items have been filed in the box which is in position for filling, the conveyor belt is started and moved so much that a new box is brought into the filling position.

To this purpose a sensing device 19 is provided for sensing whether an empty box is on its way and a sensing device 20 is provided for sensing that the empty box has been brought into the position for being filled.

These two sensings are included in the programme of FIGURES 3 and 6 after the normal programme cycle, i.e. after reset in line 17 as illustrated in the programme chart of FIGURE 9 and the schematic arrangement of FIGURE 8.

The programme chart of FIGURE 9 differs from that of FIGURE 6 thereby that the conveyor motor is included in channel 6 instead of the blowing out action for that reason only that only a total of nine channels are available in the example. If more channels had been available, the conveyor would of course have been included in a free channel.

While in FIGURES 3 and 6 the preselector counter was started as a permanent action in channel 9 and its feeler switch 17 included in line 1 only to stop the programme in line 1 when the desired number of articles had been stamped out, the preselector counter is in the programme of FIGURE 9 supposed to be rendered active as an action at the end of the programme in line 17. This means that if only the 17-line programme is used, the preselector counter will remain switched on and count the number of articles until its feeler switch 17 opens the circuit of line 1.

When for example the 500 articles have been stamped out, the counter switch 17 will be thrown over and as shown in FIGURE 8 the opening of line 1 by throwing over the switch 17 results in a connection of terminal $A_1$ through switch 17 in the dotted position to the terminal $B_{19}$ which is connected with terminal 139 in the unit plugboard.

The unit plugboard terminal 139 is connected with the input terminal 160 for the "jump" circuit JU, the output terminal 179 of which is connected to the binary code setting input terminals 142, 143, 145, 147 and 150 which is that coding that responds to line 18.

In other words the throwing over of the counter switch 17 in line 1 provides a connection to the "jump" circuit network JU and causes thereby the binary device to "jump" from line 1 to line 18 which results in start of the conveyor and performance of the programme in lines 18 and 19 with stop of the conveyor when the new box has been brought in position. This extra programme then causes reset of the control unit to line 1 by connection to terminal $B_{10}$ in line 20 whereafter the normal programme is continued until a further 500 items have been stamped out and filled into the box.

As will be obvious it will be possible in a similar manner to supply boxes to the conveyor from a reservoir of boxes.

The circuit of the "jump" network JU is shown schematically in FIGURE 10 and is the same as the circuit of the networks ZR and CC.

The "jump" circuit JU includes three transistors $VT_1$, $VT_2$ and $VT_3$. When inoperative the "jump" output is positive because the transistor $VT_3$ is closed.

When a "no" answer as in FIGURE 8 is given to the "jump" input through the plugboard terminal 150, the bistable arrangement switches over and results in a negative output on the terminal 179 for rendering a selected decimal line operative in accordance with the binary coding of the connection between the terminal 179 and a number of the terminals 141–150.

As apparent from FIGURE 1 the "jump" output is also connected with the inhibition input of the line shift network so that production of a line shift impulse is temporarily inhibited during "jump."

If it is desired to "jump" for action in more than one channel a further "jump" network must be included in the arrangement.

The test circuit network TE is schematically shown in FIGURE 11 and includes in principle two switches $T_8$ and $T_{12}$ in series adapted to break the connection between the input terminal $B_6$ and the line shift circuit. The test network further includes a 30-position switch $T_7$ which is connected with all the sensing lines and can be set to be connected with any individual line whereby an indicator lamp $T_6$ in a transistor network will show when the line search switch has been brought to the position corresponding to an operative sensing line.

A push-button switch $T_{10}$ is connected between the switch and the line search switch $T_7$ and is included in the circuitry when the switch $T_8$ has been opened to interrupt the connection to the line shift circuit. The switch $T_{10}$ can therefore be used to imitate the automatic stepping action so that if, for example the line search switch is set to line 3 and the push-button $T_{10}$ is depressed, the arrangement will proceed to line 4 and simultaneously an indicator lamp $T_9$ will show.

In a similar manner the test circuit includes a double-deck 12-position switch $T_{13}$ having the contacts of one deck connected with the command channel inputs and the contacts of the other deck connected with the command channel outputs. A pair of push-buttons $T_{14}$ and $T_{15}$ are included in series with each of these two decks and when the channel switch 12 is opened to break the connection with the other circuits it will be understood that each channel can be selected to be rendered operative by means of the channel selector switch $T_{13}$ and that the push-button $T_{14}$ will start the action in the selected channel while the push-button $T_{15}$ will stop the action in the selected channel.

Though in the foregoing the invention has been described with reference to a stamping press it will be obvious that the invention is not limited to be used with stamping presses or neither to use with machine tools. By way of example similar problems as those on the stamping press which render the use of the safety device important may be found in other fields where a permanent energy supply must be switched off if certain conditions are not fulfilled within a certain period, for example in a chemical plant in which a heater is switched on to allow the temperature to be increased during supply of different materials to be heated. In such event the heating can be interrupted outside the programme if the different materials have not been supplied while otherwise the heating is switched on as a part of the programme.

Also the use of the "memory" is in general dependent on that a certain stage of the programme must be passed without the necessity of registering that immediately.

By way of example in a chemical plant the memory function may be used to store a signal that a fluid has been heated beyond a certain temperature and thereafter is on the way to be cooled.

I claim.

1. A sequence control having a plurality of stages and including data signal means to indicate by means of feeling devices the completion of each stage of a normal program as it proceeds, electrically controlled function means which can be started and stopped by means of command signals, and switch means operatively connecting said data signal means and said function means and operable in response to coincidence between a completed program step and conditioning of the subsequent step to condition the sequence control for a command signal to be derived therefrom, wherein the improvement comprises auxiliary switch means in said sequence control for rendering ineffectual the conditioning of the sequence control to provide a command signal for the next normal program stage including further means for deriving at least one alternative command signal deviating from the normal program.

2. A sequence control according to claim 1, wherein said sequence control is rendered ineffectual upon activation of said auxiliary switch means.

3. A sequence control according to claim 1, wherein the sequence control is rendered ineffectual by said auxiliary switch means upon completion of a program cycle.

4. A sequence control according to claim 1, wherein the sequence control is rendered ineffectual by said auxiliary switch means at a predetermined stage during the performance of a program cycle.

5. A sequence control having a plurality of stages and including data signal means to indicate by means of feeling devices the completion of each stage of a normal program as it proceeds, electrically controlled function means which can be started and stopped by means of command signals, and switch means operatively connecting said data signal means and said function means and operable in response to coincidence between a completed program step and conditioning of the subsequent step to condition the sequence control for a command signal to be derived therefrom, wherein the improvement comprises manually operable auxiliary switch means in said sequence control for rendering ineffectual upon activation of said auxiliary switch means the conditioning of the sequence control to provide a command signal for the next normal program stage including further means for deriving at least one alternative command signal to selectively control at least one function means by said alternative command signal.

6. A sequence control according to claim 5, wherein said alternative command signal starts said one function means.

7. A sequence control according to claim 5, wherein said alternative command signal stops said one function means.

8. A sequence control according to claim 5, further comprising circuit means for said first-mentioned switch means, the auxiliary switch means being operatively connected in the sequence control to open said circuit means and in response thereto supply a signal, and further manually operable switch means to activate said one function means by said signal.

9. A sequence control according to claim 5, wherein the auxiliary switch means includes at least one function selector switch adapted to be selectively associated with each function means and further manually operable switch means for starting and stopping the function means selected by said switch.

10. A sequence control as claimed in claim 5, in which the auxiliary switch means includes switch means operable to render the coincidence switch means inoperable at any stage of the program and manually operable switch means to selectively condition each operation for being initiated and terminated by means of respective manually operable switch means.

11. A sequence control according to claim 5, further comprising line search switch means forming part of the auxiliary switch means, means operable to render the coincidence switch means ineffective, and means operable together with indicator means for identifying anyone of the program stage lines which is effective.

12. A sequence control according to claim 11, wherein the indicator means is in the form of a lamp indicator.

13. A sequence control having a plurality of stages and including data signal means to indicate by means of feeling devices the completion of each stage of a normal program as it proceeds, electrically controlled function means which can be started and stopped by means of command signals, and switch means operatively connecting said data signal means and said function means and operable in response to coincidence between a completed program step and conditioning of the subsequent step to condition the sequence control for a command signal to be derived therefrom, wherein the improvement comprises auxiliary jump means in said sequence control for rendering ineffectual the conditioning of the sequence control to provide a command signal only at a predetermined program stage including auxiliary switch means for deriving at least one alternative command signal to condition the command signal lines of the function means for activation out-of-program of at least one function to be carried out by a respective function means.

14. A sequence control as claimed in claim 13, in which the auxiliary switch means is operable to carry out said one function only after a plurality of sequences of the normal program.

15. A sequence control as claimed in claim 14, in which the auxiliary means is provided to enable supply of new material to a working machine.

16. A sequence control having a plurality of stages and comprising data signal means to indicate by means of feeling devices the completion of each stage of a normal program as it proceeds, electrically controlled function means which can be started and stopped by means of command signals, and coincidence means including switch means operatively connecting said data signal means and said function means and operable in response to coincidence between a completed program step and conditioning of the subsequent step to condition the sequence control for a command signal to be derived therefrom, wherein the improvement comprises auxiliary switch means in said sequence control for rendering ineffectual the conditioning of the sequence control to provide a command signal including means for deriving at least one alternative command signal complementary to the signal, which activates the coincidence means for the next following stage of the program, at a predetermined stage of the program.

17. A sequence control as claimed in claim 16, in which the said complementary signal is operable to release an alternative program having at least one stage.

18. A sequence control as claimed in claim 17, in which the coincidence means is a binary-type switch means having network means operable to set the binary switch means to any desired binary code in response to complementary signals occurring in previously modified stages.

19. A sequence control as claimed in claim 18, further comprising means operatively connecting said auxiliary switch means with said coincidence means and operable to use the complementary signal to condition the coincidence means for a jump.

20. A sequence control as claimed in claim 19, in which the binary-type switch means has a plurality of conditioning network means adapted to be set according to a binary-type coding, and the complementary signal being effectively supplied to said coincidence means by way of said conditioning network means.

21. A sequence control as claimed in claim 20, in which the alternative program is a sequence program initiated by the complementary signal and operable after completion thereof to switch the sequence control back to the normal main program.

22. A sequence control as claimed in claim 21, in which means are provided operable at the end of the alternative program to provide a release signal to reinstate the normal main program.

23. A sequence control as claimed in claim 22, further comprising program distributor means having a plurality of decimal-to-binary coded inputs.

24. A sequence control as claimed in claim 23, further comprising matrix-like decimal-to-binary converter means, binary flip-flop means, and conditioning circuit means operatively connected between said matrix means and each binary flip-flop means.

25. A sequence control as claimed in claim 24, in which the conditioning circuit means include duplex inputs to enable the alternative signal to be effective to set the binary-type flip-flop means to the desired code in response to the conditioned stage as governed by the connection through the distributor means.

26. A sequence control according to claim 25, wherein said conditioning circuit means include trigger means for producing triggering signals at several ones of different program stages.

27. A sequence control as claimed in claim 16, in which the coincidence means is a binary-type switch means having network means operable to set the binary switch means to any desired binary code in response to complementary signals occurring in previously modified stages.

28. A sequence control as claimed in claim 27, further comprising means operatively connecting said auxiliary switch means with said coincidence means and operable to use the complementary signal to condition the coincidence means for a jump.

29. A sequence control as claimed in claim 28, in which the binary-type switch means has a plurality of conditioning network means adapted to be set according to a binary-type coding, and the complementary signal being effectively supplied to said coincidence means by way of said conditioning network means.

30. A sequence control as claimed in claim 27, in which the alternative program is a sequence program initiated by the complementary signal and operable after completion thereof to switch the sequence control back to the normal main program.

31. A sequence control as claimed in claim 30, in which means are provided operable at the end of the alternative program to provide a release signal to reinstate the normal main program.

32. A sequence control as claimed in claim 27, further comprising program distributor means having a plurality of decimal-to-binary coded inputs.

33. A sequence control as claimed in claim 32, further comprising matrix-like decimal-to-binary converter means, binary flip-flop means, and conditioning circuit means operatively connected between said matrix means and each binary flip-flop means.

34. A sequence control as claimed in claim 33, in which the conditioning circuit means include duplex inputs to enable the alternative signal to be effective to set the binary-type flip-flop means to the desired code in response to the conditioned stage as governed by the connection through the distributor means.

35. A sequence control according to claim 33, wherein said conditioning circuit means include trigger means for producing triggering signals at several ones of different program stages.

36. A sequence control having a plurality of stages and including data signal means to indicate by means of feeling devices the completion of each stage of a normal program as it proceeds, electrically controlled function means which can be started and stopped by means of command signals, and switch means operatively connecting said data signal means and said function means and operable in response to coincidence between a completed program step and conditioning of the subsequent step to condition the sequence control for a command signal to be derived therefrom, wherein the improvement comprises auxiliary switch means in said sequence control for rendering ineffectual the conditioning of the sequence control to provide a command signal for the next program stage and for deriving at least one alternative command signal, and control means for controlling said auxiliary switch means by a function independent of the sequence control.

37. A sequence control as claimed in claim 36, in which the auxiliary switch means is operable to provide signals to at least one function during each sequence cycle, and means for overruling said last-mentioned signals by a fault-free sequence control.

38. A sequence control as claimed in claim 37, comprising in addition to the auxiliary switch means, a substitute switch means included in the sequence control.

39. A sequence control as claimed in claim 38, further comprising means operable to provide a positive stop command by said auxiliary switch means during the predetermined stage of the function which is controlled independently of the sequence control, and means in the sequence control for producing positive stop signals by said substitute switch means in the event of follow-up of the sequence control with the independently controlled function.

40. A sequence control as claimed in claim 36, in which the independently controlled function is speed-controlled.

41. A sequence control as claimed in claim 36, in which the independently controlled function is the movement of the tool in a press.

42. A sequence control as claimed in claim 36, in which between the independently controlled function and its control source, an electrically controlled means is provided selectively operable to be rendered effective to provide continuous function or to be rendered ineffective to interrupt the function.

43. A sequence control as claimed in claim 36, in which the independently controlled function is split up into two half portions, each of which is included in the sequence control in such a manner that a command to continue the function is given from the sequence control, while command to discontinue the function is given from a positioning-responsive outside source.

44. A sequence control for a stamping press according to claim 43, in which the outside source is the flywheel-driven power source for the press, the alternative program provides a positive stop signal to said press, the alternative program is an automatic feed-in device for the band to the press, and the stop command is given to the main clutch of the press in response to predetermined positions of the press tool, and means for producing from the sequence control a command operable to overrule the stop signal upon completion by the feed tool of its feed stroke according to the program and upon rendering effective the line activating the duplicate of the press tool positioning sensing switch.

45. A sequence control as claimed in claim 44, further comprising means operable to check that the feed stroke is as programmed and means operable to signal if the feed stroke is less than programmed.

46. A sequence control as claimed in claim 45, further comprising sensing switch means to be actuated by underfeed and being duplicated by switch means in the sequence control arrangement which is used as sensing switch indicative of the completion of the feed stroke.

References Cited

UNITED STATES PATENTS

| | | | |
|---|---|---|---|
| 2,649,155 | 8/1953 | Spiller | 83—69 |
| 2,729,879 | 1/1956 | Sampson | 83—62 X |
| 2,878,873 | 3/1959 | Novak | 83—71 X |
| 3,015,977 | 1/1962 | Stegink et al. | 83—61 |
| 3,094,028 | 6/1963 | Ausenda et al. | 83—71 |
| 3,245,556 | 4/1966 | Thumim | 83—71 X |

ANDREW R. JUHASZ, *Primary Examiner.*

WILLIAM S. LAWSON, *Examiner.*